(12) United States Patent
Nakashima

(10) Patent No.: US 10,739,582 B2
(45) Date of Patent: Aug. 11, 2020

(54) AIR PURGE UNIT

(71) Applicant: OMRON Corporation, Kyoto (JP)

(72) Inventor: Hirotaka Nakashima, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 100 days.

(21) Appl. No.: 16/133,662

(22) Filed: Sep. 17, 2018

(65) Prior Publication Data

US 2019/0101749 A1   Apr. 4, 2019

(30) Foreign Application Priority Data

Oct. 3, 2017   (JP) .................................. 2017-193323

(51) Int. Cl.
*G02B 27/00* (2006.01)

(52) U.S. Cl.
CPC ................. *G02B 27/0006* (2013.01)

(58) Field of Classification Search
CPC .............................. G02B 27/0006; B08B 5/02
See application file for complete search history.

(56) References Cited

U.S. PATENT DOCUMENTS

2005/0186114 A1   8/2005   Reinhardt et al.

FOREIGN PATENT DOCUMENTS

| CN | 107219900 | 9/2017 |
|---|---|---|
| DE | 19707223 | 9/1997 |
| DE | 102007016099 | 10/2008 |
| JP | 2012002750 | 1/2012 |
| KR | 100625103 | 9/2006 |
| WO | 2018215843 | 11/2018 |

OTHER PUBLICATIONS

"Search Report of Europe Counterpart Application", dated Feb. 20, 2019, p. 1-p. 8.
"Office Action of Europe Counterpart Application," dated Nov. 27, 2019, p. 1-p. 6.

*Primary Examiner* — Wen Huang
(74) *Attorney, Agent, or Firm* — JCIPRNET

(57) ABSTRACT

An air purge unit which blows out air to a lens surface of an optical sensor includes: a first surface and a second surface which are opposite to each other; a third surface which is located along a direction intersecting with the first surface and the second surface; a first connection part, a second connection part and a third connection part which are respectively arranged on the first surface, the second surface and the third surface, and to which an air injector for injecting air to the inside of the air purge unit is selectively connected; and an air blowout part which blows out the air injected to the inside of the air purge unit to the lens surface of the optical sensor.

5 Claims, 5 Drawing Sheets

AIR PURGE UNIT

CROSS-REFERENCE TO RELATED APPLICATION

This application claims the priority of Japan patent application serial no. 2017-193323, filed on Oct. 3, 2017. The entirety of the above-mentioned patent application is hereby incorporated by reference herein and made a part of this specification.

BACKGROUND

Technical Field

The disclosure relates to an air purge unit.

Description of Related Art

Conventionally, in order to detect the presence or absence of an object in a detection area, a photoelectric sensor which is a kind of optical sensor is used. The photoelectric sensor is configured so that, for example, a light projector for emitting a light to the detection area and a light receiver for receiving the emitted light are included; when an object exists between the light projector and the light receiver, the light is shielded and an amount of light received by the light receiver is reduced. The photoelectric sensor detects the presence or absence of an object by analyzing this reduction. Furthermore, there is also a photoelectric sensor in which the light projector and the light receiver are accommodated in an integral housing, and the presence or absence of an object is detected by reflecting a light on the object and analyzing the reflection light.

The photoelectric sensor may be installed in an environment of machining. In such an environment, there is an occasion that dirt such as dust or processing oil is attached to the lens surface of the photoelectric sensor through which the light passes, and the amount of light passing through the lens surface is reduced. As a result, that the object cannot be appropriately detected. Therefore, a means is taken to mount an air purge unit for blowing out air to the lens surface on the photoelectric sensor, and to prevent an attachment of dirt to the lens surface. In patent literature 1 (Japanese Laid-open No. 2012-002750), a means is disclosed to jet a gas from a gas supply hole around the lens surface, and prevent the attachment of dirt to the lens surface. Besides, generally, an air injector is connected to the air purge unit, and the air supplied from an air supply source is injected to the inside of the air purge unit via the air injector.

Problems to be Solved

Meanwhile, a position in which an air injector is connected is usually fixed, and thus an installation position of the air purge unit or an installation position of the optical sensor is greatly limited.

Therefore, the embodiment of disclosure provides an air purge unit having an improved degree of freedom in the installation position.

Means to Solve Problems

SUMMARY

The air purge unit of one embodiment of the disclosure is an air purge unit which blows out air to a lens surface of an optical sensor and includes: a first surface and a second surface which are opposite to each other; a third surface which is located along a direction intersecting with the first surface and the second surface; a first connection part, a second connection part and a third connection part which are respectively arranged on the first surface, the second surface and the third surface, and to which an air injector for injecting air to the inside of the air purge unit is selectively connected; and an air blowout part which blows out the air injected to the inside of the air purge unit to the lens surface of the optical sensor.

BRIEF DESCRIPTION OF THE DRAWINGS

FIG. 3(a) is a drawing showing a state before an air injector is connected to the connection part, and FIG. 3(b) is a drawing showing a state after the connection.

FIG. 4(a) is a drawing showing a state before a plug is connected to the connection part, and FIG. 4(b) is a drawing showing a state after the connection.

DESCRIPTION OF THE EMBODIMENTS

Figure 1:
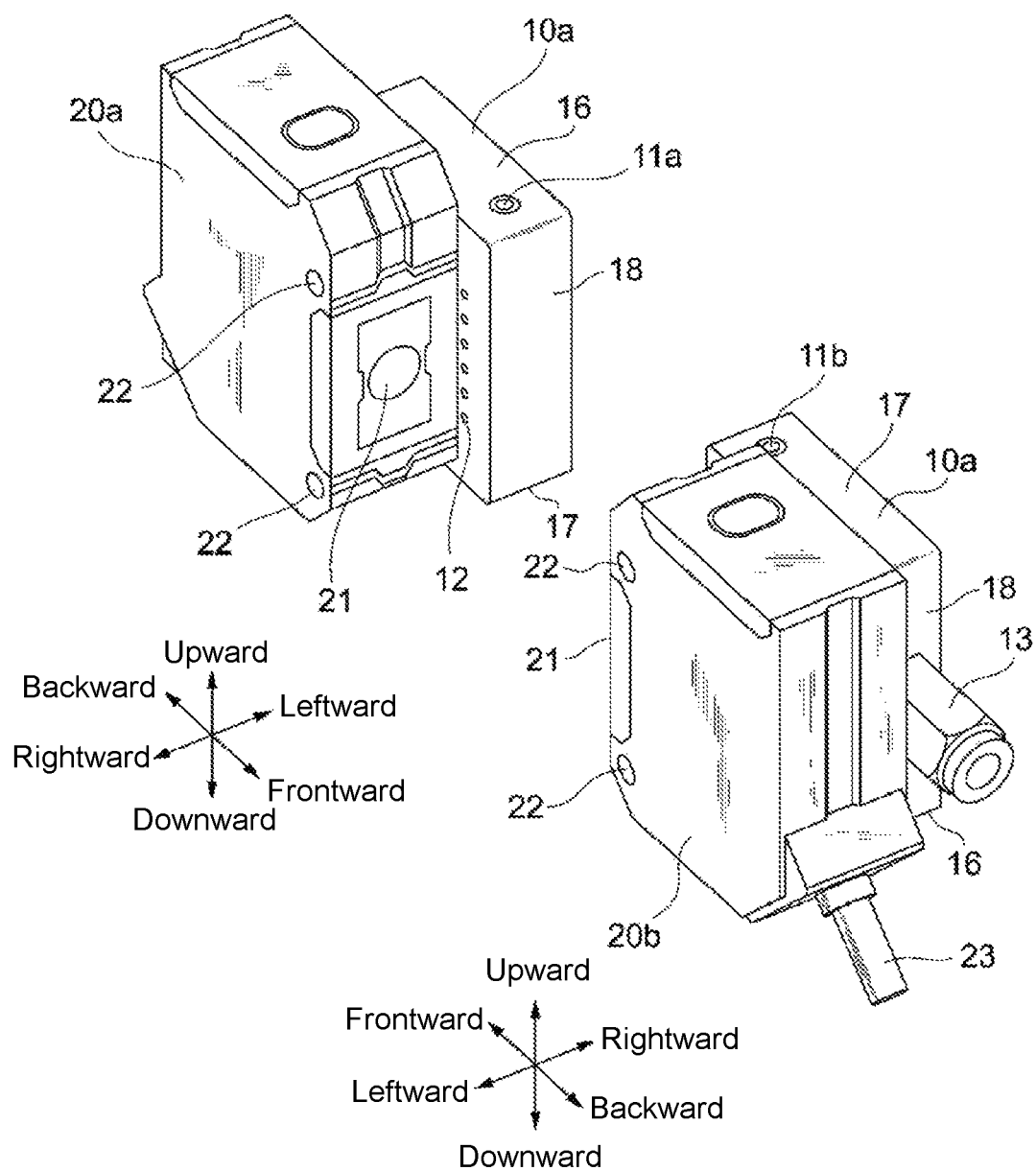
FIG. 1 is a perspective view showing a state in which an air purge unit of a first embodiment of the disclosure is mounted on a photoelectric sensor.

The air purge unit of one embodiment of the disclosure is an air purge unit which blows out air to a lens surface of an optical sensor and includes: a first surface and a second surface which are opposite to each other; a third surface which is located along a direction intersecting with the first surface and the second surface; a first connection part, a second connection part and a third connection part which are respectively arranged on the first surface, the second surface and the third surface, and to which an air injector for injecting air to the inside of the air purge unit is selectively connected; and an air blowout part which blows out the air injected to the inside of the air purge unit to the lens surface of the optical sensor.

According to this embodiment, in the air purge unit, a plurality of connection parts for connecting the air injector is arranged. Therefore, the connection location of the air injector can be selected corresponding to the position for installing the air purge unit, and the degree of freedom in the installation position of the air purge unit can be improved.

In the above embodiment, the air injector may be further included.

According to this embodiment, the air supply source and the air purge unit are connected by the air injector, and the air from the air supply source can be supplied to the inside of the air purge unit via the air injector.

In the above embodiment, a plug may be further included which is detachably attached to a connection part which is among the first connection part, the second connection part and the third connection part and to which the air injector is not connected.

According to this embodiment, by attaching the plug to the connection part to which the air injector is not connected, the air is prevented from leaking out of the connection part to which the air injector is not connected. Besides, the plug is detachably attached so that the attachment position of the plug can be changed corresponding to the connection location of the air injector.

In the above embodiment, each of the first connection part, the second connection part and the third connection part may include a screw hole, the air injector may include a screw part screwed with the screw hole, and the plug may include a screw part screwed with the screw hole.

According to this embodiment, the screw hole of the connection part of the air purge unit and the screw part of the air injector are screwed, the screw hole of the connection part of the air purge unit and the screw part of the plug are screwed, and the air injector and the plug can be more firmly connected to the air purge unit.

In the above embodiment, the air purge unit may be detachably installed on the optical sensor.

According to this embodiment, the air purge unit mounted on the optical sensor can be removed and can be replaced to other optical sensors. Besides, when the optical sensor is used in the environment in which dirt is attached to the lens surface of the optical sensor and the air purge unit is necessary, the air purge unit can be mounted on the optical sensor; when the optical sensor is used in the environment in which the air purge unit is unnecessary, the air purge unit can be removed.

In the above embodiment, the first connection part and the second connection part may be located in a first straight line which perpendicularly intersects with the first surface and the second surface, and the third connection part may be located in a second straight line which bisects a line segment in the first straight line connecting the first connection part and the second connection part.

According to this embodiment, even when the air purge unit is mounted on any one of the optical sensors which are installed opposite to each other, the air injector can be selectively mounted on any one of an upper side surface, a lower side surface and a rear side surface of the air purge unit.

Effect

According to the disclosure, an air purge unit having an improved degree of freedom in the installation position can be provided.

Embodiments of the disclosure are described with reference to the attached drawings. Furthermore, in each drawing, the parts which are denoted by the same symbol have the same or similar configuration.

First Embodiment

FIG. 1 is a perspective view showing a state in which an air purge unit 10a of a first embodiment of the disclosure is mounted on a photoelectric sensor. The photoelectric sensor uses a light to detect the presence or absence of an object in a detection area or a surface state of the object. There is a plurality of detection methods using the photoelectric sensor. For example, two photoelectric sensors are prepared, one photoelectric sensor is used as a light projector 20a for emitting the light, and the other photoelectric sensor is used as a light receiver 20b for receiving the light. When an object exists between the light projector 20a and the light receiver 20b, an amount of light received by the light receiver 20b is reduced so that the reduction is analyzed and the presence or absence of the object is detected. The photoelectric sensor used in the above detection method is called a transmission type.

Besides, as another detection method, there is a method for conducting the detection by using a photoelectric sensor in which the light projector and the light receiver are integral. The light from the photoelectric sensor is emitted toward a reflector or the detection object, the reflected light is received and analyzed by the same photoelectric sensor, thereby detecting the presence or absence of the object. The photoelectric sensor which acts as both the light projector and the light receiver is called a reflection type. In the embodiment, the photoelectric sensor of the transmission type is described as an example, but the photoelectric sensor to which the embodiment of the disclosure is applied is not limited to the transmission type, and may also be the reflection type.

Furthermore, in the specification, a state in which the air purge unit 10a is mounted on the photoelectric sensor is described as an example, but the optical sensor on which the air purge unit 10a is mounted is not limited to the photoelectric sensor. The air purge unit 10a can be mounted to various optical sensors by which the detection result is affected due to the dirt attached to the lens surface. For example, the optical sensor may be a displacement sensor, an image sensor, or a bar-code reader.

With reference to FIG. 1, the configurations of the photoelectric sensor and the air purge unit 10a are described. In the embodiment, two photoelectric sensors are prepared, one is used as the light projector 20a and the other is used as the light receiver 20b. The light projector 20a and the light receiver 20b are arranged so that the lens surfaces 21 of them are opposite to each other, and the light emitted by the light projector 20a is received by the light receiver 20b.

For convenience of description, in regard to the light projector 20a, when the light projector 20a is arranged on the floor, directions of front and back, up and down, and left and right are defined by using an advancing direction of the emitted light as a frontward direction. Besides, in regard to the light receiver 20b, when the light receiver 20b is arranged on the floor, directions of front and back, up and down, and left and right are defined by using an incident direction of the light as a frontward direction.

The light projector 20a emits a light toward the detection area. The emitted light passes through the detection area, and is incident to the light receiver 20b. The light projector 20a includes a lens surface 21 and a second mounting part 22. Besides, although it is not shown in the drawing, the light projector 20a is connected to an amplifier and a power supply via a cable. Furthermore, at least any one of the amplifier and the power supply may be built in the light projector 20a.

The lens surface 21 is a surface through which the light emitted from the light projector 20a passes. The lens surface 21 is made of any material that transmits a light, such as glass or resin.

The second mounting part 22 is a portion on which the air purge unit 10a is mounted and which has a concave. Besides, the air purge unit 10a includes a first mounting part 14 having a convex. By fitting the convex of the first mounting part 14 and the concave of the second mounting part 22, the air purge unit 10a is mounted on the light projector 20a. Furthermore, the connection method of the first mounting part 14 and the second mounting part 22 may be any method, as long as the air purge unit 10a and the light projector 20a are detachable by the method. The second mounting part 22 is arranged on a left side surface and a right side surface of the light projector 20a. Therefore, the air purge unit 10a can be mounted on any one of the left side surface and the right side surface of the light projector 20a.

The light receiver 20b receives the light emitted from the light projector 20a. The light receiver 20b analyzes the received light and detects the presence or absence of an object in the detection area. The light receiver 20b is connected to the power supply via a cable 23. Furthermore, the power supply may be built in the light receiver 20b. Besides, the light receiver 20b may send the detection result to other equipment via the cable 23.

The light receiver 20b includes a lens surface 21 and a second mounting part 22. The lens surface 21 of the light receiver 20b is an incident surface of the light when the light receiver 20b receives the light. The lens surface 21 is made of any material that transmits a light, such as glass or resin.

The second mounting part 22 of the light receiver 20b is a portion on which the air purge unit 10a is mounted, and has a configuration similar to the second mounting part 22 of the light projector 20a.

On the left side surface of the light projector 20a and the right side surface of the light receiver 20b, the air purge units 10a for blowing out air to the lens surfaces 21 of the light projector 20a and the light receiver 20b are respectively mounted.

The air purge unit 10a blows out air to the lens surface 21 of the light projector 20a or the light receiver 20b. Furthermore, the air purge unit 10a mounted on the light projector 20a and the air purge unit 10a mounted on the light receiver 20b have the similar configuration. The specific configuration of the air purge unit 10a is described below using FIG. 2.

Furthermore, in order that an air purge unit 10a which has a configuration similar to the air purge unit 10a mounted on the left side surface of the light projector 20a is mounted on the right side surface of the light receiver 20b, the air purge unit 10a is mounted upside down. Therefore, in the air purge unit 10a of the light receiver 20b, a first surface 16 is located on a downward side, and a second surface 17 is located on an upward side.

Figure 2:
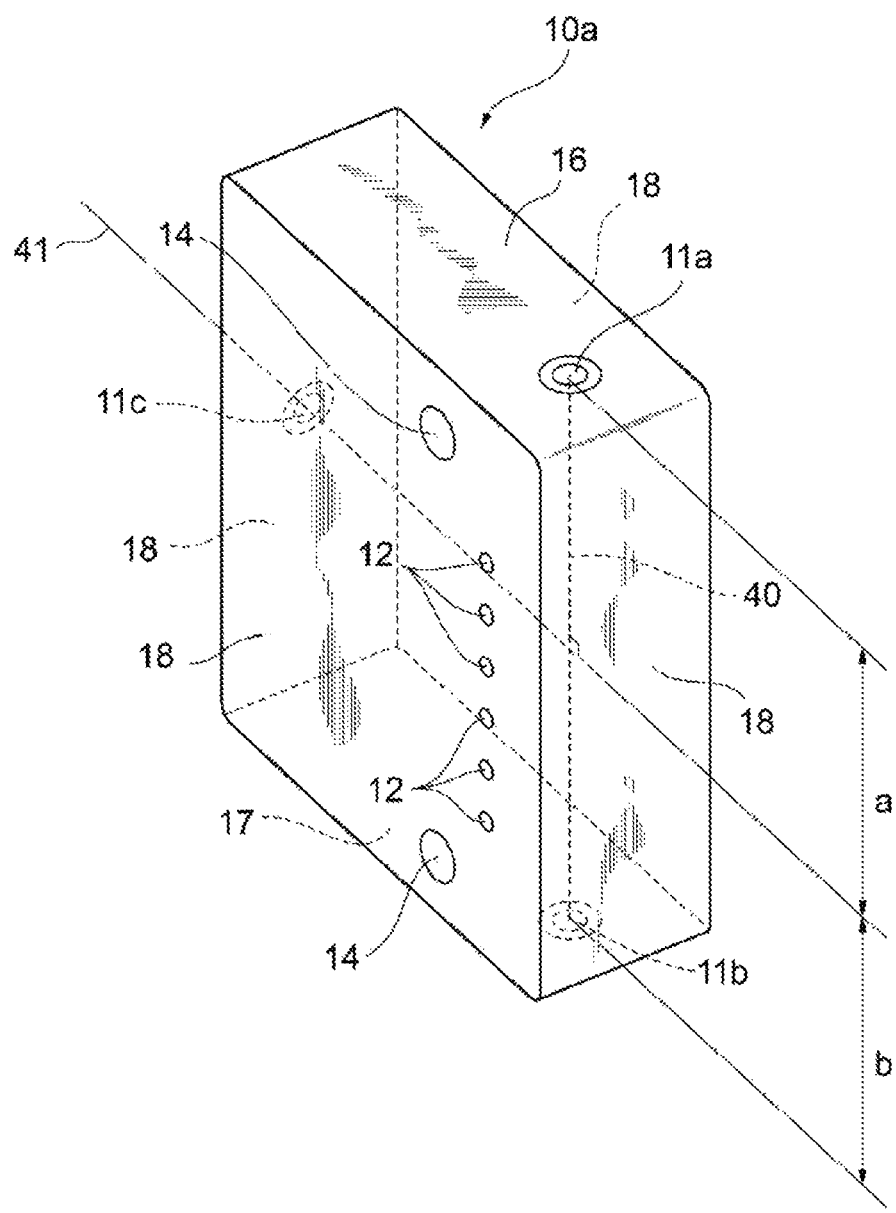
FIG. 2 is a drawing showing the air purge unit of the first embodiment of the disclosure.

FIG. 2 is a drawing showing the air purge unit 10a of the first embodiment of the disclosure. FIG. 2 shows the air purge unit 10a which is mounted on the light projector 20a shown in FIG. 1. The air purge unit 10a includes a first connection part 11a, a second connection part 11b, a third connection part 11c, an air blowout part 12, a first mounting part 14, a first surface 16, a second surface 17, and a third surface 18.

The first surface 16, the second surface 17 and the third surface 18 are side surfaces of the air purge unit 10a. When the light projector 20a is arranged on the floor, a surface of the air purge unit 10a which is located farthest from the floor is set as the first surface 16, and a surface opposite to the first surface 16 is set as the second surface 17. Besides, a surface of the air purge unit 10a which is located in a direction intersecting with the first surface 16 and the second surface 17 is set as the third surface 18. The air purge unit 10a has a plurality of third surfaces 18.

The first connection part 11a, the second connection part 11b, and the third connection part 11c are portions to which the air injector 13 for injecting air to the inside of the air purge unit 10a is connected. The first connection part 11a, the second connection part 11b, and the third connection part 11c are respectively arranged on the first surface 16, the second surface 17, and the third surface 18. Here, the third connection part 11c may be arranged on at least any one of the plurality of third surfaces 18. Furthermore, in the specification, the first connection part 11a, the second connection part 11b, and the third connection part 11c are generically named and simply referred to as a "connection part 11".

The first connection part 11a and the second connection part 11b are located in a first straight line which perpendicularly intersects with the first surface 16 and the second surface 17. Besides, in the first straight line, a line segment which connects the connection part 11a and the second connection part 11b is set as a line segment 40. The third connection part 11c is located in a second straight line 41 which bisects the line segment 40. That is, a distance a from the first connection part 11a to the second straight line 41 is equal to a distance b from the second connection part 11b to the second straight line 41. Using the second straight line 41 in which the third connection part 11c is located as a symmetric axis, the connection parts 11 of the air purge unit 10a are symmetrically arranged.

Because such a configuration is used, the air purge unit 10a can be turned upside down and replaced from the light projector 20a to the light receiver 20b (see FIG. 1). At this time, the air blowout part 12 is located on the lens surface 21 side of the light receiver 20b. The second connection part 11b, which is located on the lower side surface of the air purge unit 10a when the air purge unit 10a is mounted on the light projector 20a, is located on the upper side surface in a state that the air purge unit 10a is mounted on the light receiver 20b. Besides, the first connection part 11a, which is located on the upper side surface of the air purge unit 10a when the air purge unit 10a is mounted on the light projector 20a, is located on the lower side surface in a state that the air purge unit 10a is mounted on the light receiver 20b. Furthermore, similar to the state when the air purge unit 10a is mounted on the light projector 20a, the third connection part 11c is located on the rear side surface of the air purge unit 10a. That is, no matter the air purge unit 10a is mounted on the light projector 20a or the light receiver 20b, the air injector 13 can be selectively mounted on any one of the upper side surface, the lower side surface, and the rear side surface of the air purge unit 10a.

The air blowout part 12 blows out the air inside the air purge unit 10a to the lens surface 21 of the light projector 20a. The air injected from the air injector 13 which is connected to any one of the first connection part 11a, the second connection part 11b and the third connection part 11c is jetted from the air blowout part 12 through a flow path inside the air purge unit 10a. Furthermore, a blowout of air toward the lens surface 21 may be conducted at all times, or at regular time intervals.

The air purge unit 10a of the embodiment is provided with a plurality of connection parts 11 for connecting the air injector 13. Therefore, the connection location of the air injector 13 can be selected corresponding to the installation position of the air purge unit 10a, and the degree of freedom in the installation position of the air purge unit 10a can be improved. That is, the air injector 13 is connected to any one of the connection parts 11 so that the installation of the air purge unit 10a is not obstructed by the air injector 13.

Besides, the air purge unit 10a of the embodiment is detachably mounted on the optical sensor, so that the air purge unit 10a mounted on the optical sensor can be removed and can be replaced to other optical sensors. Besides, when the optical sensor is used in the environment in which dirt is attached to the lens surface 21 of the optical sensor and the air purge unit 10a is necessary, the air purge unit 10a can be mounted on the optical sensor; when the optical sensor is used in the environment in which the air purge unit 10*a* is unnecessary, the air purge unit 10*a* can be removed.

Furthermore, according to the air purge unit 10*a* of the embodiment, even when the air purge unit 10*a* is mounted on any one of the optical sensors which are installed opposite to each other, the air injector 13 can be selectively mounted on any one of the upper side surface, the lower side surface, and the rear side surface of the air purge unit 10*a*.

Figure 3A:
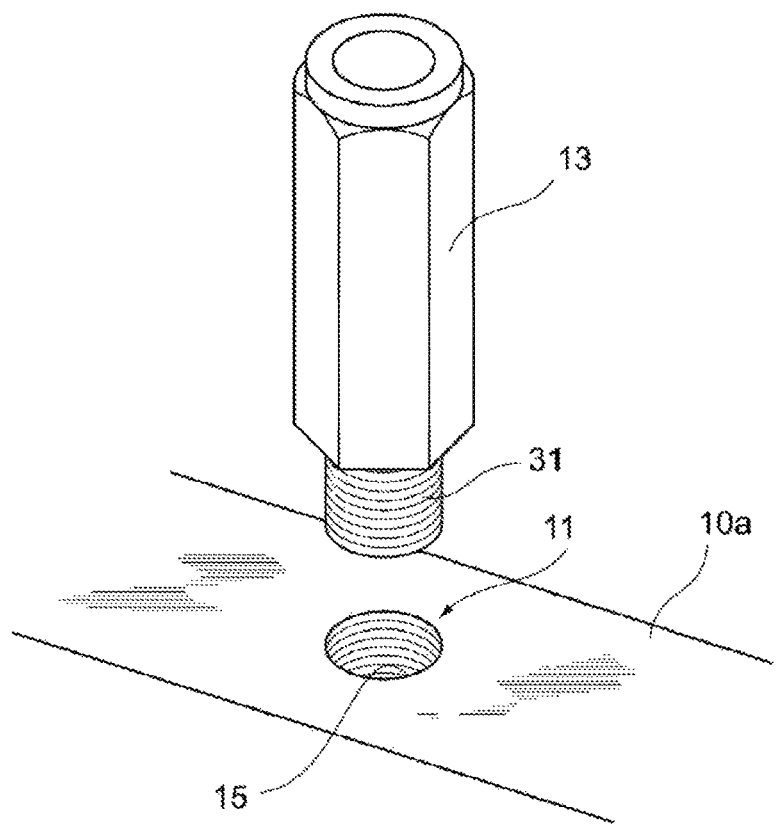
FIGS. 3(a) and 3(b) relate to a connection part of the air purge unit of the first embodiment of the disclosure.
Figure 3B:
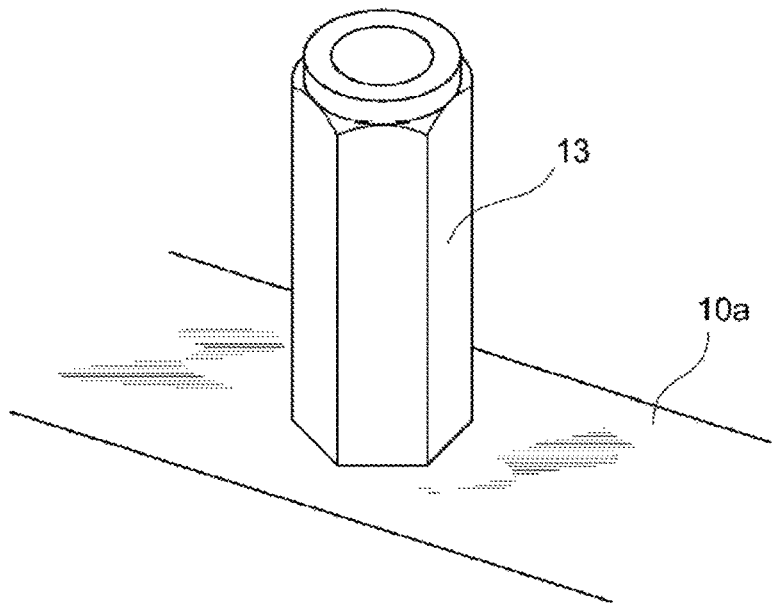

FIGS. 3(*a*) and 3(*b*) are drawings relating to the connection part 11 of the air purge unit 10*a* of the first embodiment. FIG. 3(*a*) is a drawing showing a state before the air injector 13 is connected to the connection part 11; FIG. 3(*b*) is a drawing showing a state after the connection.

The air injector 13 injects the air which is supplied from the air supply source to the inside of the air purge unit 10*a*. The air injector 13 has a screw part 31 at one end. Besides, the connection part 11 of the air purge unit 10*a* has a screw hole 15. The air injector 13 and the connection part 11 are connected by the screwing of the screw part 31 and the screw hole 15.

Furthermore, the connection of the air injector 13 and the connection part 11 may not be conducted by screwing, and any method can be taken in which the air injector 13 and the connection part 11 are detachable.

Figure 4A:
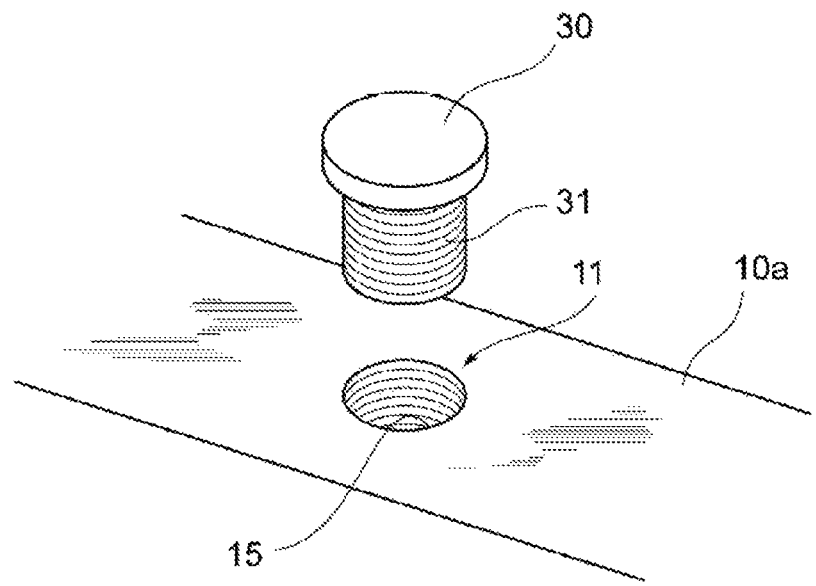
FIGS. 4(a) and 4(b) relate to a connection part of the air purge unit of the first embodiment of the disclosure.
Figure 4B:
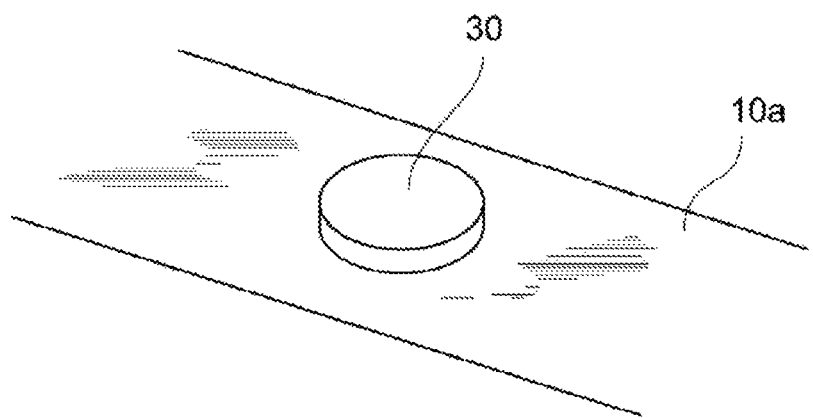

FIGS. 4(*a*) and 4(*b*) are drawings relating to the connection part 11 of the air purge unit 10*a* of the first embodiment; FIG. 4(*a*) is a drawing showing a state before a plug 30 is connected to the connection part 11; FIG. 4(*b*) is a drawing showing a state after the connection.

The plug 30 is loaded on the connection part 11 to which the air injector 13 is not connected, and the air is prevented from leaking out of the connection part 11 to which the air injector 13 is not connected. All of the first connection part 11*a*, the second connection part 11*b* and the third connection part 11*c* are associated with the air blowout part 12 via the flow path of air formed inside the air purge unit 10*a*, and the first connection part 11*a*, the second connection part 11*b* and the third connection part 11*c* are also associated with each other via the flow path. Therefore, when the air is injected from any one of the connection parts 11, the injected air leaks out of the other connection parts 11. Therefore, by attaching the plug 30 to the connection part 11 to which the air injector 13 is not connected, the air can be prevented from leaking out.

The plug 30 has a screw part 31 at one end. Besides, the connection part 11 of the air purge unit 10*a* has a screw hole 15. The plug 30 and the connection part 11 are connected by the screwing of the screw part 31 and the screw hole 15.

Furthermore, the connection of the plug 30 and the connection part 11 may not be conducted by screwing, and any method can be taken in which the plug 30 and the connection part 11 are detachable.

According to the air purge unit 10*a* of the embodiment, the air supply source and air purge unit 10*a* are connected by the air injector 13, and the air from the air supply source can be supplied to the inside of the air purge unit 10*a* via the air injector 13.

Besides, according to the air purge unit 10*a* of the embodiment, by attaching the plug 30 to the connection part 11 to which the air injector 13 is not connected, the air is prevented from leaking out of the connection part 11 to which the air injector 13 is not connected. Besides, because the plug 30 is detachably attached, the loading position of the plug 30 can be changed corresponding to the connection location of the air injector 13.

Furthermore, according to the air purge unit 10*a* of the embodiment, the screw hole 15 of the connection part 11 of the air purge unit 10*a* and the screw part 31 of the air injector 13 are screwed, the screw hole 15 of the connection part 11 of the air purge unit 10*a* and the screw part 31 of the plug 30 are screwed, and the air injector 13 and the plug 30 are more firmly connected to the air purge unit 10*a*.

Second Embodiment

Figure 5:
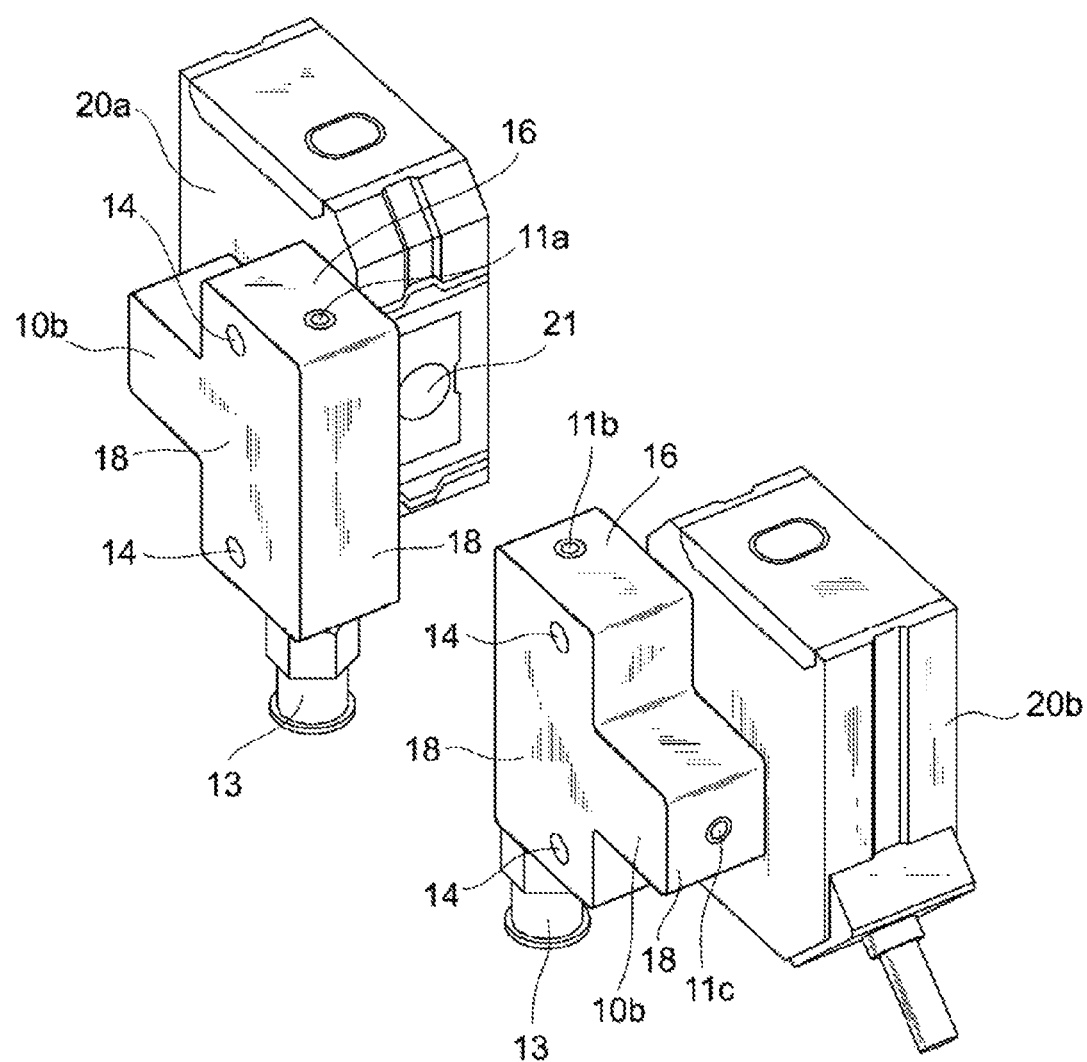
FIG. 5 is a perspective view showing a state in which an air purge unit of a second embodiment of the disclosure is connected to the photoelectric sensor.

FIG. 5 is a drawing showing an air purge unit 10*b* of the second embodiment of the disclosure and a photoelectric sensor. The air purge unit 10*a* of the first embodiment and the air purge unit 10*b* of the second embodiment are different in the mounting location to the photoelectric sensor, the connection location of the air injector 13 and a body shape. Other configuration is similar to the configuration of the air purge unit 10*a* of the first embodiment.

The air purge unit 10*a* of the first embodiment is mounted on the left side surface of the light projector 20*a* and the right side surface of the light receiver 20*b* (see FIG. 1), while in this embodiment, as shown in FIG. 5, the air purge unit 10*b* is mounted on the right side surface of the light projector 20*a* and the left side surface of the light receiver 20*b*. As shown in FIG. 1 and FIG. 5, the air purge units 10*a*, 10*b* can be mounted on both the right side surface and the left side surface of the photoelectric sensor (the light projector 20*a* and the light receiver 20*b*).

Besides, in the air purge unit 10*a* of the first embodiment, the air injector 13 is connected to the third connection part 11*c* which is arranged on the rear side surface of the air purge unit 10*a* (see FIG. 1), while in the second embodiment, the air injector 13 is connected to the second connection part 11*b* which is arranged on the lower side surface of the air purge unit 10*b* mounted on the light projector 20*a*, and to the first connection part 11*a* which is arranged on the lower side surface of the air purge unit 10*b* mounted on the light receiver 20*b*. As shown in FIG. 1 and FIG. 5, the air injector 13 can be selectively connected to any one of the first connection part 11*a*, the second connection part 11*b*, and the third connection part 11*c*.

The body shape of the air purge unit 10*a* of the first embodiment is formed in a state that the third surface 18 is associated with the first surface 16 and the second surface 17, while the air purge unit 10*b* in the embodiment is formed so that upper and lower corners on the rearward side have a recessed shape, and the third surface 18 is not associated with the first surface 16 and the second surface 17. The third surface 18 may not be associated with the first surface 16 and the second surface 17, and may be arranged along the direction intersecting with the first surface 16 and the second surface 17. Besides, the body shape of the air purge unit 10*b* is set, as shown in FIG. 5, to a shape that the upper and lower corners on the rearward side are recessed; in this way, the space saving of the air purge unit 10*b* can be realized.

The embodiments described above intend to make it easy to understand the disclosure, instead of interpreting the disclosure in a limitative way. Each element included in the embodiments, and arrangements, materials, conditions, shapes and sizes thereof can be appropriately changed instead of being limited to the illustrations. Besides, the configurations shown in different embodiments may be partially substituted or combined with each other.

APPENDIX

An air purge unit, which is an air purge unit 10*a* that blows out air to a lens surface 21 of a optical sensor, including:

a first surface 16 and a second surface 17 which are opposite to each other;

a third surface 18 which is located along a direction intersecting with the first surface 16 and the second surface 17;

a first connection part 11a, a second connection part 11b and a third connection part 11c which are respectively arranged on the first surface 16, the second surface 17 and the third surface 18, and to which an air injector 13 for injecting air to the inside of the air purge unit 10a is selectively connected; and an air blowout part 12 which blows out the air injected to the inside of the air purge unit 10a to the lens surface 21 of the optical sensor.

What is claimed is:

1. An air purge unit configured to blow out air to a lens surface of an optical sensor, comprising:
    a first surface and a second surface which are opposite to each other;
    a third surface which is located along a direction intersecting with the first surface and the second surface;
    a first connection part, a second connection part and a third connection part which are respectively arranged on the first surface, the second surface and the third surface, and to which an air injector for injecting air to the inside of the air purge unit is selectively connected;
    an air blowout part configured to blow out the air injected to the inside of the air purge unit to the lens surface of the optical sensor; and
    a plug detachably attached to a connection part which is among the first connection part, the second connection part and the third connection part and to which the air injector is not connected.

2. The air purge unit according to claim 1, further comprising the air injector.

3. The air purge unit according to claim 1, wherein each of the first connection part, the second connection part and the third connection part comprises a screw hole,
    the air injector comprises a screw part screwed with the screw hole, and
    the plug comprises a screw part screwed with the screw hole.

4. The air purge unit according to claim 1, which is detachably mounted on the optical sensor.

5. The air purge unit according to claim 1, wherein the first connection part and the second connection part are located in a first straight line which perpendicularly intersects with the first surface and the second surface, and the third connection part is located in a second straight line which bisects a line segment in the first straight line connecting the first connection part and the second connection part.

* * * * *